(12) United States Patent
Wang

(10) Patent No.: US 11,762,263 B2
(45) Date of Patent: Sep. 19, 2023

(54) DRIVING MECHANISM

(71) Applicant: TDK TAIWAN CORP., Taoyuan (TW)

(72) Inventor: Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/686,795

(22) Filed: Mar. 4, 2022

(65) Prior Publication Data

US 2022/0283477 A1 Sep. 8, 2022

Related U.S. Application Data

(60) Provisional application No. 63/157,095, filed on Mar. 5, 2021.

(51) Int. Cl.
*G03B 9/10* (2021.01)
*G03B 5/00* (2021.01)
*G02B 7/04* (2021.01)
*G02B 13/00* (2006.01)

(52) U.S. Cl.
CPC ............ *G03B 9/10* (2013.01); *G02B 7/04* (2013.01); *G02B 13/001* (2013.01); *G03B 5/00* (2013.01); *G03B 2205/0069* (2013.01)

(58) Field of Classification Search
CPC .... G03B 9/10; G03B 2205/0069; G03B 9/08; G03B 9/14; G03B 9/36; G03B 9/40
USPC .................................................. 396/488–489
See application file for complete search history.

(56) References Cited

U.S. PATENT DOCUMENTS

| | | | | |
|---|---|---|---|---|
| 2,887,027 A | * | 5/1959 | Rentschler | G03B 9/08 396/494 |
| 9,851,553 B1 | * | 12/2017 | Stephenson | G01J 1/0403 |
| 2004/0062542 A1 | * | 4/2004 | Watanabe | G03B 9/14 396/463 |
| 2012/0093496 A1 | * | 4/2012 | Liu | G03B 11/043 396/439 |

FOREIGN PATENT DOCUMENTS

| | | | | |
|---|---|---|---|---|
| JP | S61119139 U | * | 7/1986 | |
| KR | 20070052428 A | * | 5/2007 | ............... G03B 9/40 |
| WO | WO-2019007359 A1 | * | 1/2019 | ............... G03B 9/14 |

* cited by examiner

*Primary Examiner* — Christopher E Mahoney
(74) *Attorney, Agent, or Firm* — MUNCY, GEISSLER, OLDS & LOWE, P.C.

(57) ABSTRACT

A driving mechanism is provided, including a fixed part, a movable assembly, an optical assembly, and a driving assembly. The movable assembly movably connects the fixed part with the optical assembly. The driving assembly is configured to drive the movable assembly and the optical assembly to move relative to the fixed part.

16 Claims, 11 Drawing Sheets

DRIVING MECHANISM

CROSS REFERENCE TO RELATED APPLICATIONS

This application claims the benefit of U.S. Provisional Application No. 63/157,095, filed Mar. 5, 2021, the entirety of which is incorporated by reference herein.

BACKGROUND OF THE INVENTION

Field of the Invention

The present invention relates to a driving mechanism, and, in particular, to a driving mechanism that has a rotary arm.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, to reduce the size of the shutter or aperture mechanism in a camera module can be difficult. Therefore, addressing the aforementioned problems has become a challenge.

BRIEF SUMMARY OF THE INVENTION

An embodiment of the present invention provides a driving mechanism that includes a fixed part, a movable assembly, an optical assembly, and a driving assembly. The movable assembly movably connects the fixed part with the optical assembly. The driving assembly is configured to drive the movable assembly and the optical assembly to move relative to the fixed part.

In some embodiments, the driving mechanism as claimed in claim 1, wherein the fixed part has a hole, the optical assembly has a first right blade, and when the optical assembly is in a closed position relative to the fixed part, the first right blade at least partially covers the hole.

In some embodiments, the first right blade has a longitudinal structure, and the fixed part has a rectangular structure, wherein a long axis of the first right blade is parallel to a short axis of the fixed part.

In some embodiments, the movable assembly has a right rotary arm connected to the first right blade, and the right rotary arm is pivotally connected to the fixed part via a first hinge, wherein when the optical assembly is in an open position relative to the fixed part, the first right blade covers the first hinge.

In some embodiments, the driving assembly has a magnet and a coil, and the fixed part has a recess for receiving the magnet and the coil, wherein the magnet surrounds the first hinge.

In some embodiments, the recess has a first space and a second space, the coil is disposed in the first space, and the magnet is disposed in the second space.

In some embodiments, the driving assembly further has a magnetic permeable element disposed in the first space and extending through the coil.

In some embodiments, the magnetic permeable element has an U-shaped structure.

In some embodiments, the optical assembly further has a second right blade, and the right rotary arm has a first pivot portion pivotally connected to the first right blade and a second pivot portion pivotally connected to the second right blade, wherein the second pivot portion is located between the first pivot portion and the first hinge.

In some embodiments, the first right blade has a first slot, and the second right blade has a second slot, wherein the first and second pivot portions are slidably received in the first and second slots.

In some embodiments, the driving mechanism further comprises a cover connected to the fixed part and exposed to a side of the driving mechanism, wherein the second right blade is located between the first right blade and the cover.

In some embodiments, the first right blade slidably contacts a first inner sidewall of the fixed part, and the second right blade slidably contacts a second inner sidewall of the fixed part.

In some embodiments, the fixed part forms a stepped structure that includes the first inner sidewall and the second inner sidewall.

In some embodiments, the optical assembly further has a first left blade, and when the optical assembly is in a closed position relative to the fixed part, the first right blade contacts the first left blade to block light from entering the electronic device.

In some embodiments, the first right blade and the first left blade respectively forms a slope surface in contact with each other when the optical assembly is in a closed position relative to the fixed part.

In some embodiments, when the optical assembly is in a closed position relative to the fixed part, the first right blade partially overlaps the first left blade.

In some embodiments, the optical assembly further has a second right blade and a second left blade, and the movable assembly has a right rotary arm and a left rotary arm, wherein the right rotary arm pivotally connects to the fixed part and the first and second right blades, and the left rotary arm pivotally connects to the fixed part and the first and second left blades.

In some embodiments, the right rotary arm is pivotally connected to the fixed part via a first hinge, and the left rotary arm is pivotally connected to the fixed part via a second hinge, wherein when the optical assembly is in an open position relative to the fixed part, the first and second right blades cover the first hinge, and the first and second left blades cover the second hinge.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
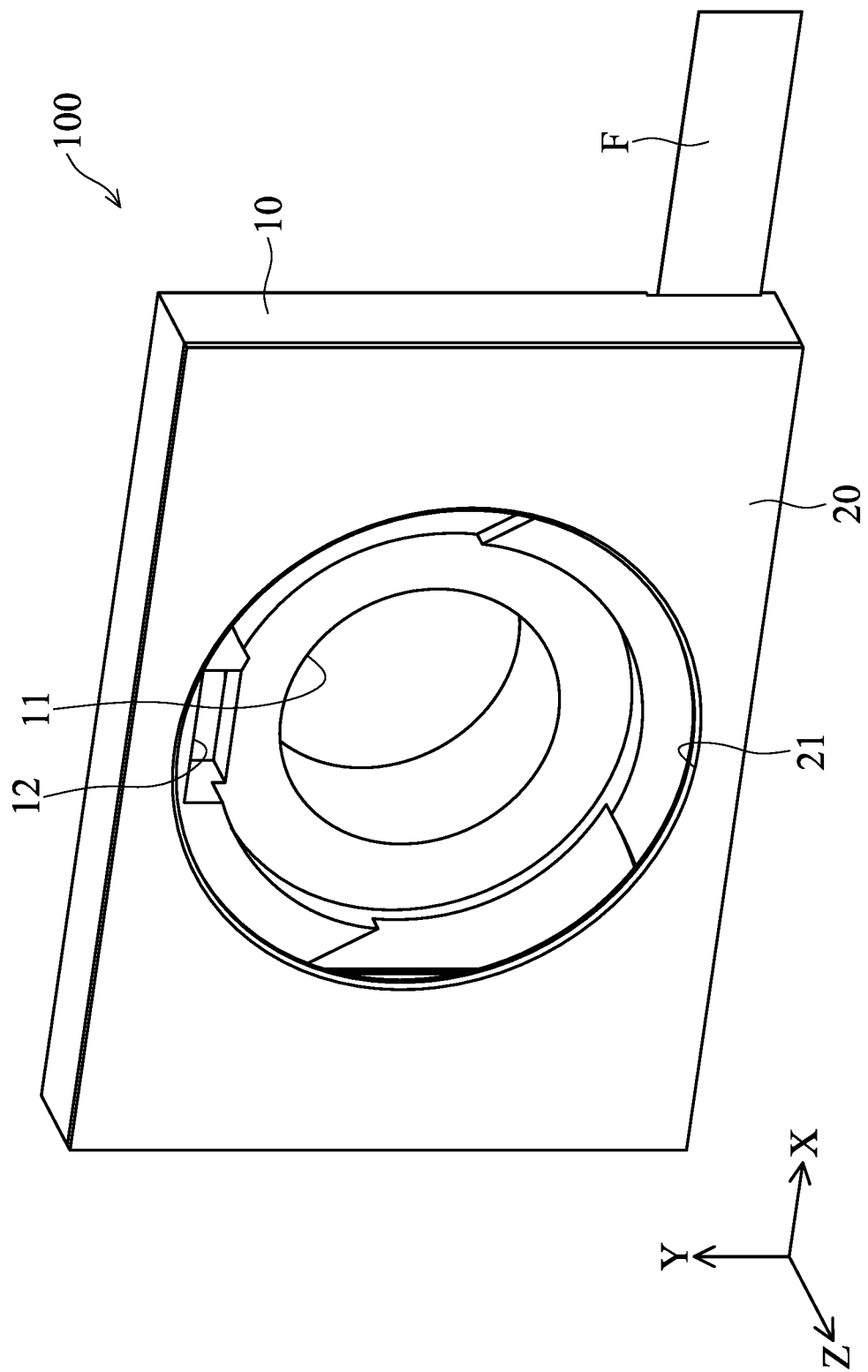
FIGS. 1-3 are perspective diagrams of a driving mechanism 100 from different views, in accordance with an embodiment of the invention.
Figure 2:
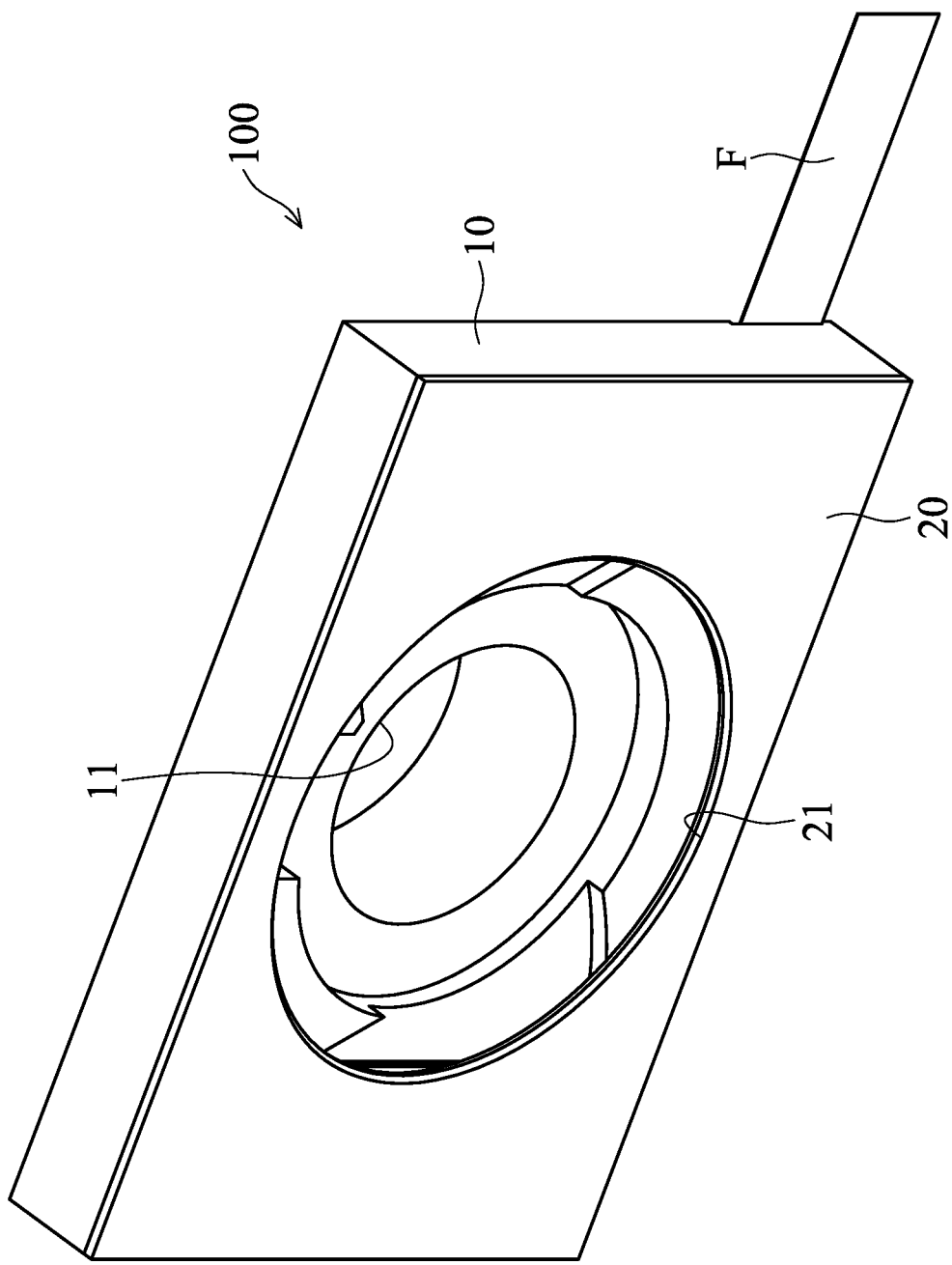
Figure 3:
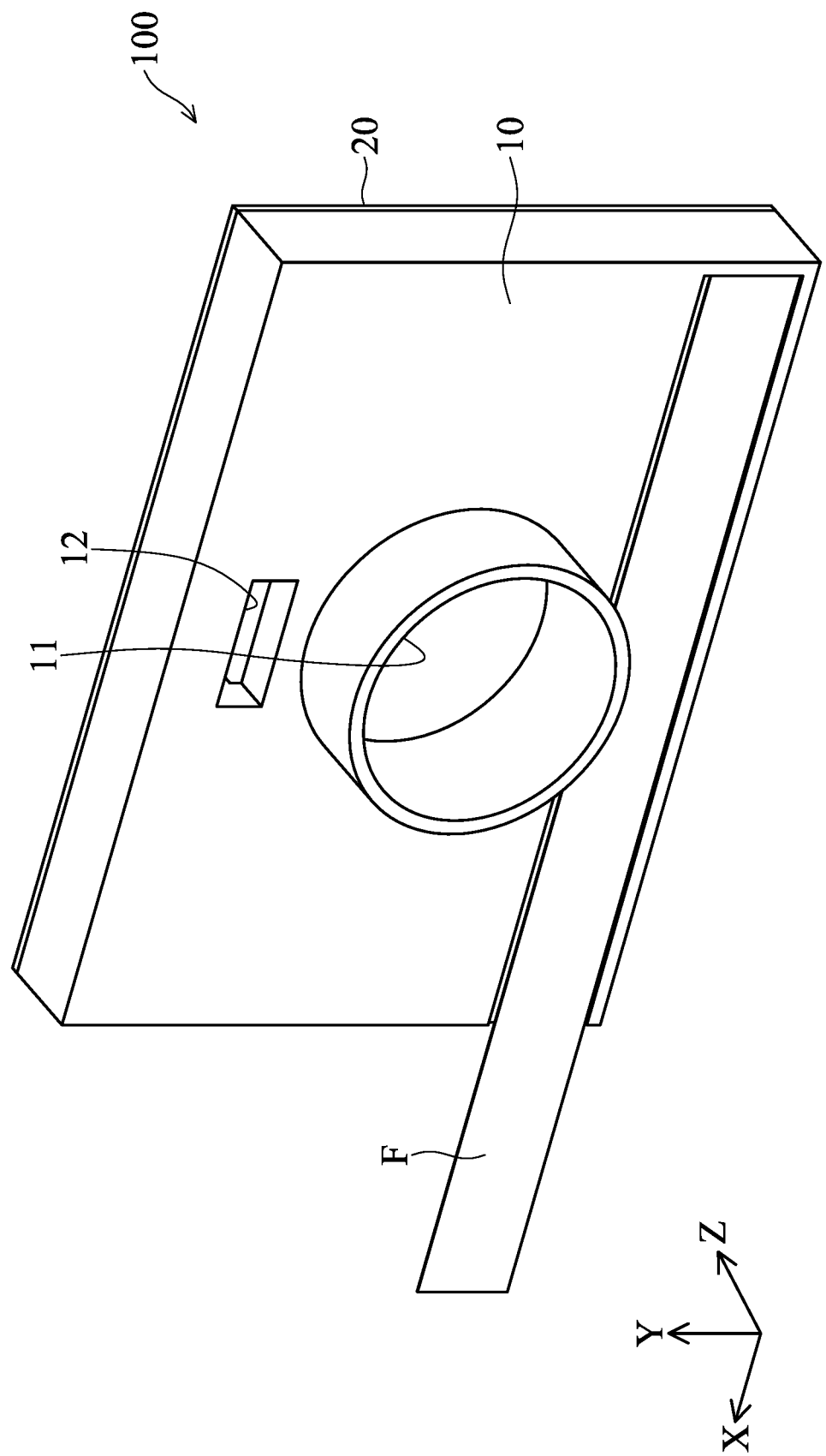
Figure 4:
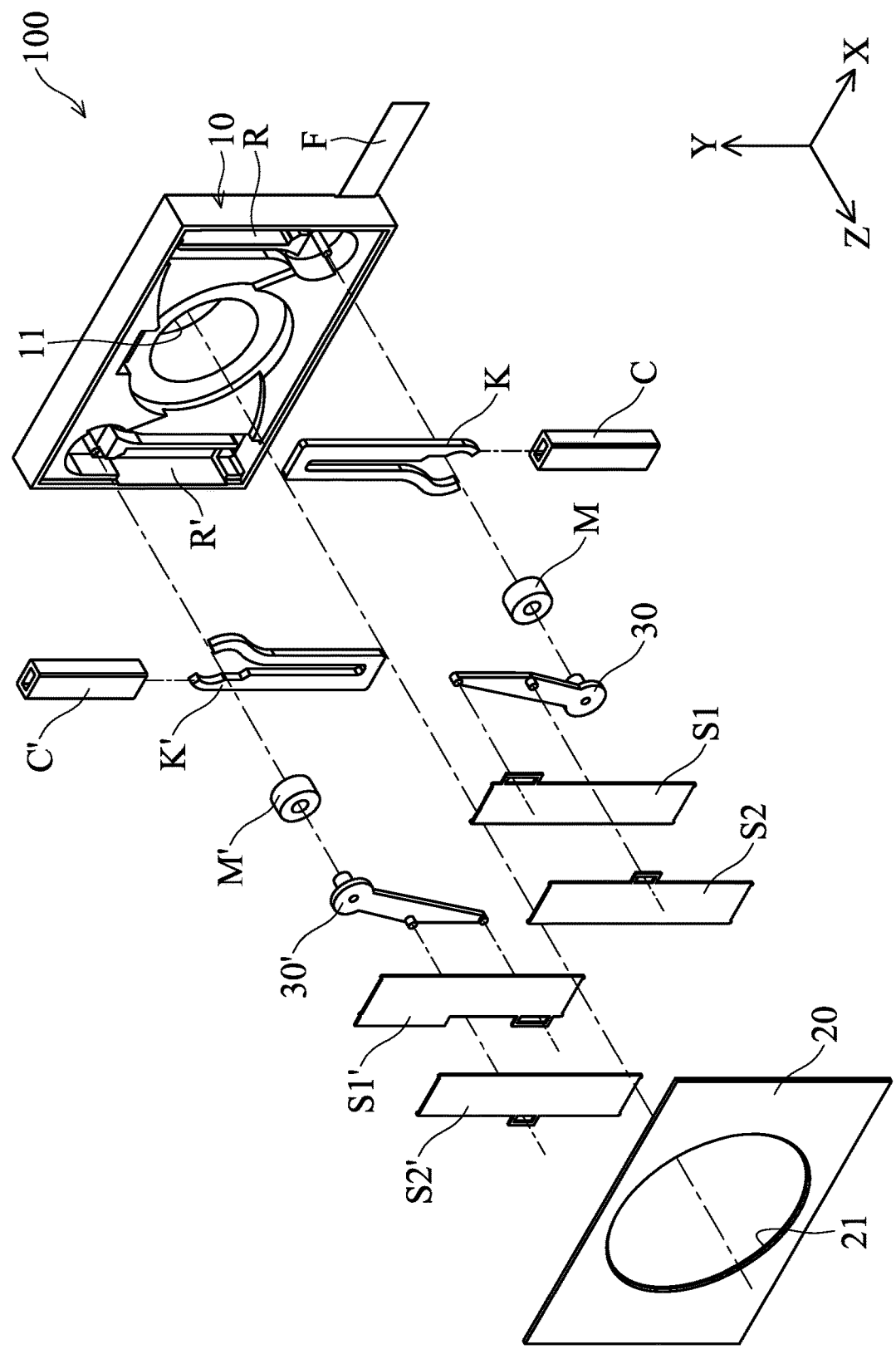
FIG. 4 is an exploded diagram of the driving mechanism 100 of FIG. 1.

FIGS. 1-3 are perspective diagrams of a driving mechanism 100, in accordance with an embodiment of the invention. FIG. 4 is an exploded diagram of the driving mechanism 100 of FIG. 1.

The driving mechanism 100 in this embodiment is disposed in an electronic device such as a cell phone, tablet computer, or other portable electronic devices. Referring to FIGS. 1-4, the driving mechanism 100 primarily comprises a fixed part 10 (housing), a cover 20, a right rotary arm 30, a left rotary arm 30', a circuit board F, two coils C and C', two magnets M and M', two magnetic permeable elements K and K', a first right blade S1, a second right blade S2, a first left blade S1', and a second left blade S2'.

The fixed part 10 is affixed in the electronic device, and the cover 20 is mounted on the fixed part 10. Specifically, the first and second right blades S1, S2 and the first and second left blades S1', S2' are movably connected to the fixed part 10 via the right and left rotary arms 30 and 30'.

The right and left rotary arms 30 and 30' constitute a movable assembly of the driving mechanism 100, wherein the right rotary arm 30 pivotally connects to the fixed part 10 and the first and second right blades S1, S2, and the left rotary arm 30' pivotally connects to the fixed part 10 and the first and second left blades S1', S2'. When the right and left rotary arms 30 and 30' rotate relative to the fixed part 10, the first and second right blades S1, S2 and the first and second left blades S1', S2' are driven to move in a direction parallel to a long axis (X axis) of the fixed part 10, whereby the driving mechanism 100 can be used as a shutter or aperture of a camera unit in the electronic device.

In this embodiment, the fixed part 10 has a round hole 11 and a longitudinal opening 12. When the first and second right blades S1, S2 and the first and second left blades S1', S2' are in an open position as shown in FIGS. 1-3, light can enter the electronic device via a hole 21 of the cover 20 and the hole 11 of the fixed part 10. Subsequently, light is projected onto an image sensor (not shown) to form an digital image. Additionally, an optical range finder (not shown) in the electronic device can generate a light signal through the opening 12 and the hole 21 to an object outside the electronic device. The light signal can be reflected by the object and then propagates sequentially through the hole 21 and the opening 12 to the optical range finder, so as to determine the distance from the electronic device to the object.

Figure 10:
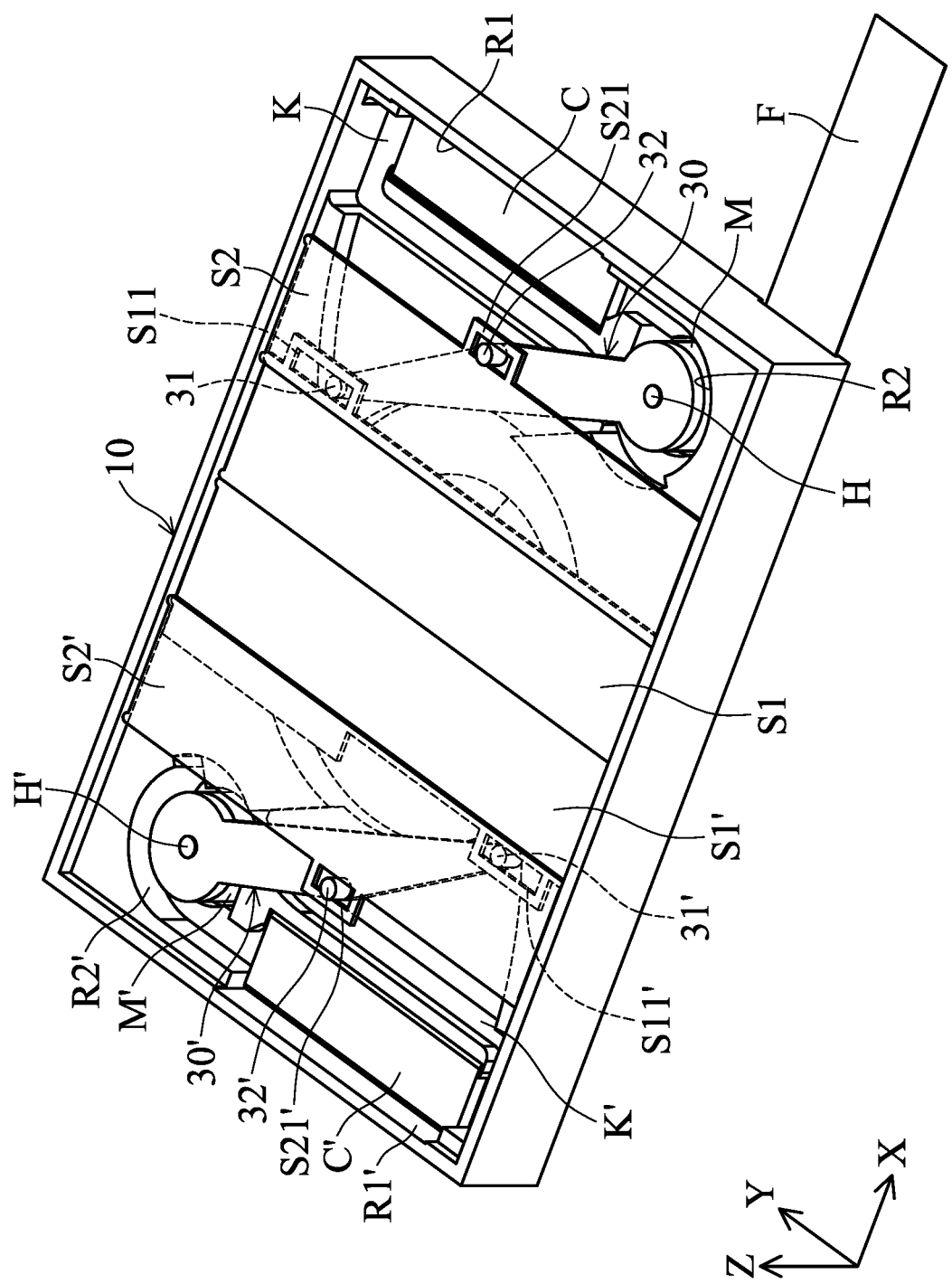
FIG. 10 is a perspective diagram showing that when a current signal is applied to the coils C, C', the first and second right blades S1, S2 and the first and second left blades S1', S2' are driven by the right and left rotary arms 30, 30' to slide relative to the fixed part 10 to a closed position.

However, when the right and left rotary arms 30 and 30' impel the optical assembly (the first and second right blades S1, S2 and the first and second left blades S1', S2') sliding relative to the fixed part 10 to a closed position as shown in FIG. 10, the hole 11 can be entirely or partially covered by the optical assembly, so as to block light from entering the electronic device and protect the components inside the driving mechanism.

Figure 5:
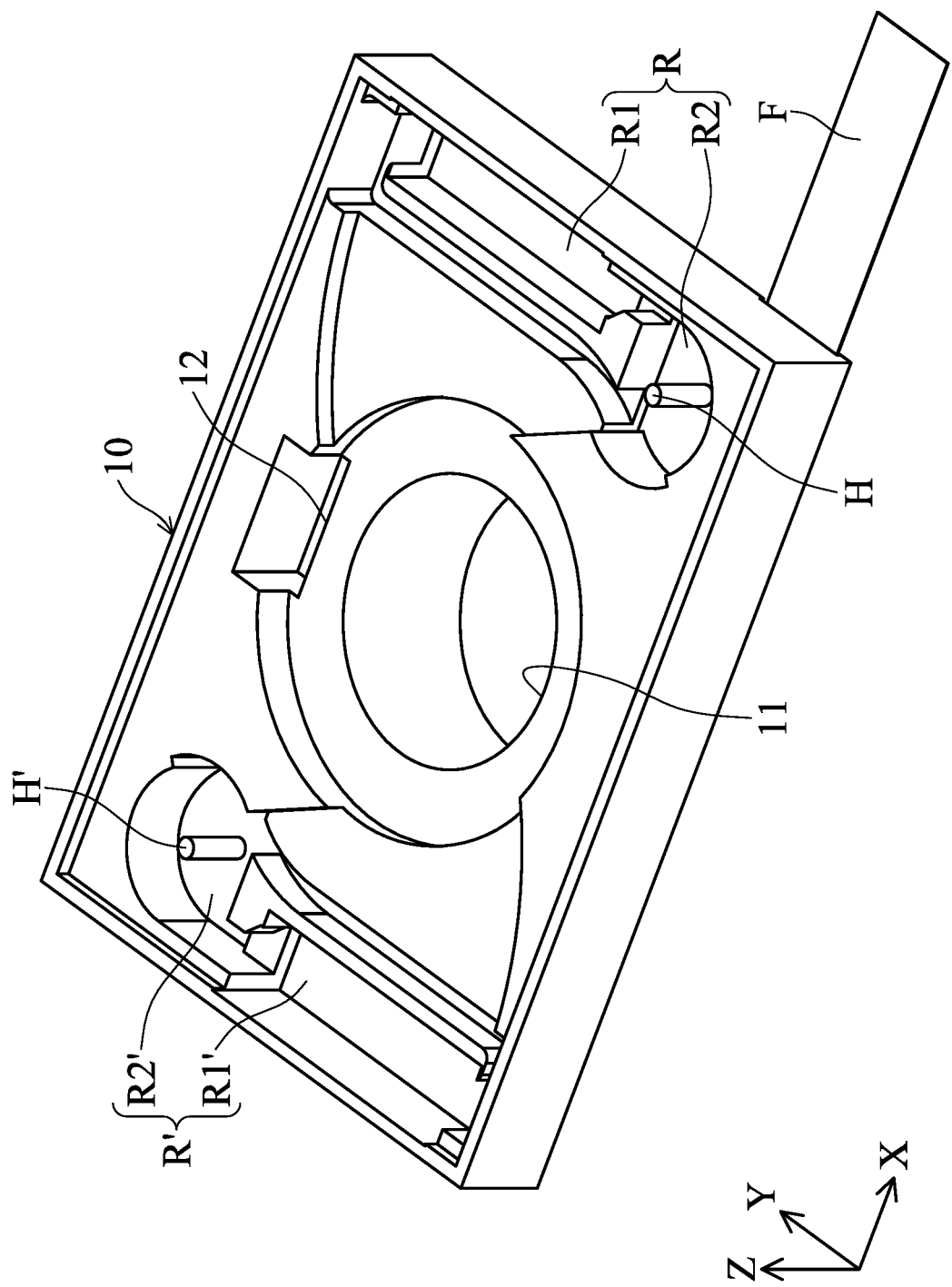
FIG. 5 is a perspective diagram of the fixed part 10 and the circuit board F in FIG. 4.
Figure 6:
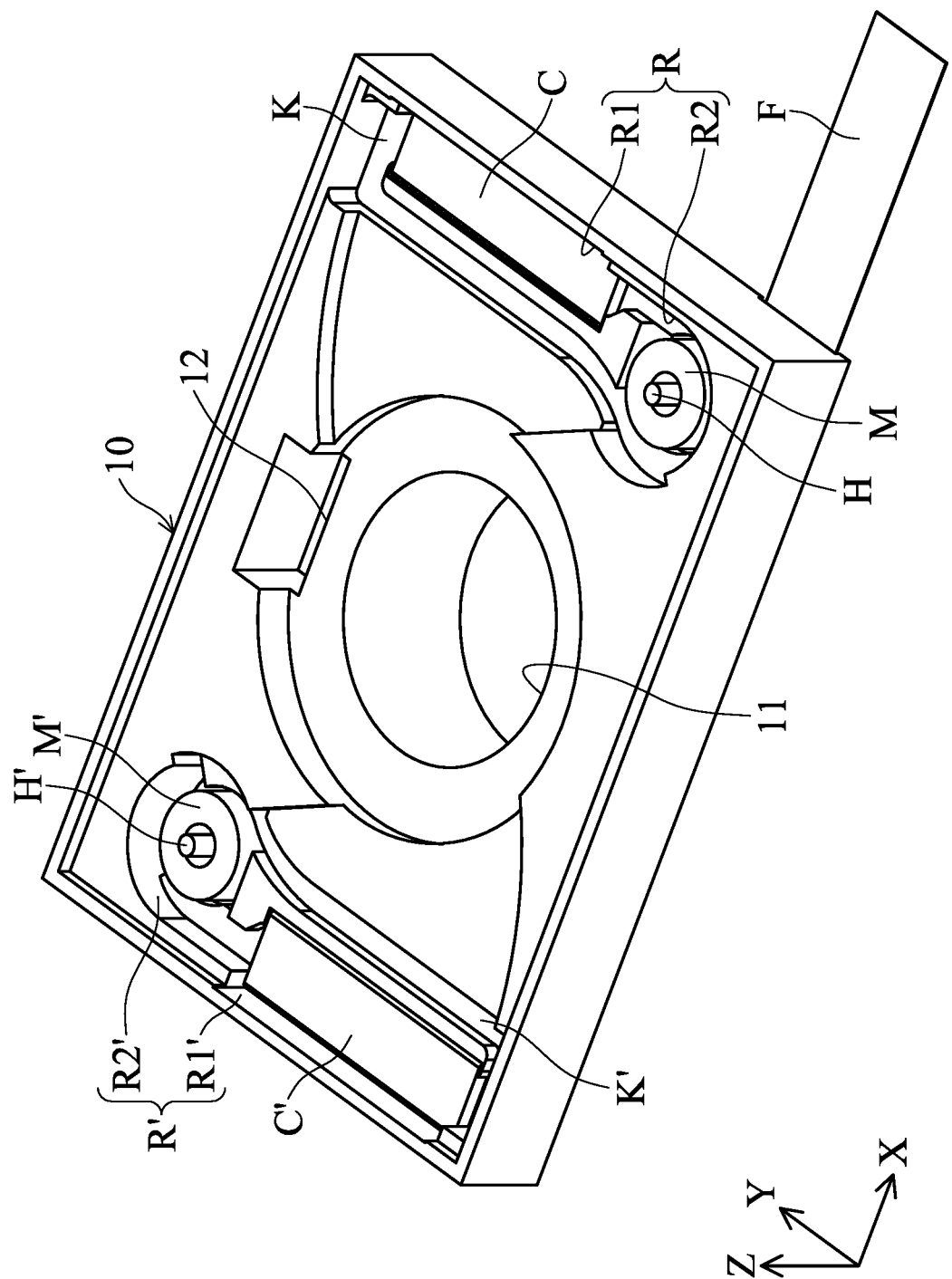
FIG. 6 is a perspective diagram showing the magnets M, M', the coils C and C', and the magnetic permeable elements K, K' disposed in the recesses R and R' of the fixed part 10.

FIG. 5 is a perspective diagram of the fixed part 10 and the circuit board F in FIG. 4. FIG. 6 is a perspective diagram showing the magnets M, M', the coils C and C', and the magnetic permeable elements K, K' disposed in the recesses R and R' of the fixed part 10. In this embodiment, the coils C, C' are electrically connected to the circuit board F on the fixed part 10 through conductive wires (not shown).

Referring to FIGS. 4-6, two recesses R and R' are formed on the inner side of the fixed part 10. During assembly, the coil C and the magnetic permeable element K are disposed in a first space R1 of the recess R on the right side of the hole 11, and the magnet M is disposed in a second space R2 of the recess R.

Specifically, the first space R1 has a longitudinal shape, and the magnetic permeable element K has a U-shaped structure. The magnetic permeable element K extends through the coil C, and they can be positioned in the first space R1 first space R1 together during assembly.

Moreover, the second space R2 and the magnet M have a round shape. During assembly, the hollow magnet M can be disposed in the second space R2, wherein a first hinge H formed on the fixed part 10 extends through the hollow magnet M, so as to prevent the magnet M from being separated from the second space R2.

Similarly, the coil C' and the magnetic permeable element K' are disposed in a first space R1' of the recess R' on the left side of the hole 11, and the magnet M' is disposed in a second space R2' of the recess R'.

The first space R1' has a longitudinal shape, and the magnetic permeable element K' has a U-shaped structure. The magnetic permeable element K' extends through the coil C', and they can be positioned in the first space R1' first space R1' together during assembly.

Moreover, the second space R2' and the magnet M' have a round shape. During assembly, the hollow magnet M' can be disposed in the second space R2', wherein a second hinge H' formed on the fixed part 10 extends through the hollow magnet M', so as to prevent the magnet M' from being separated from the second space R2'.

Figure 7:
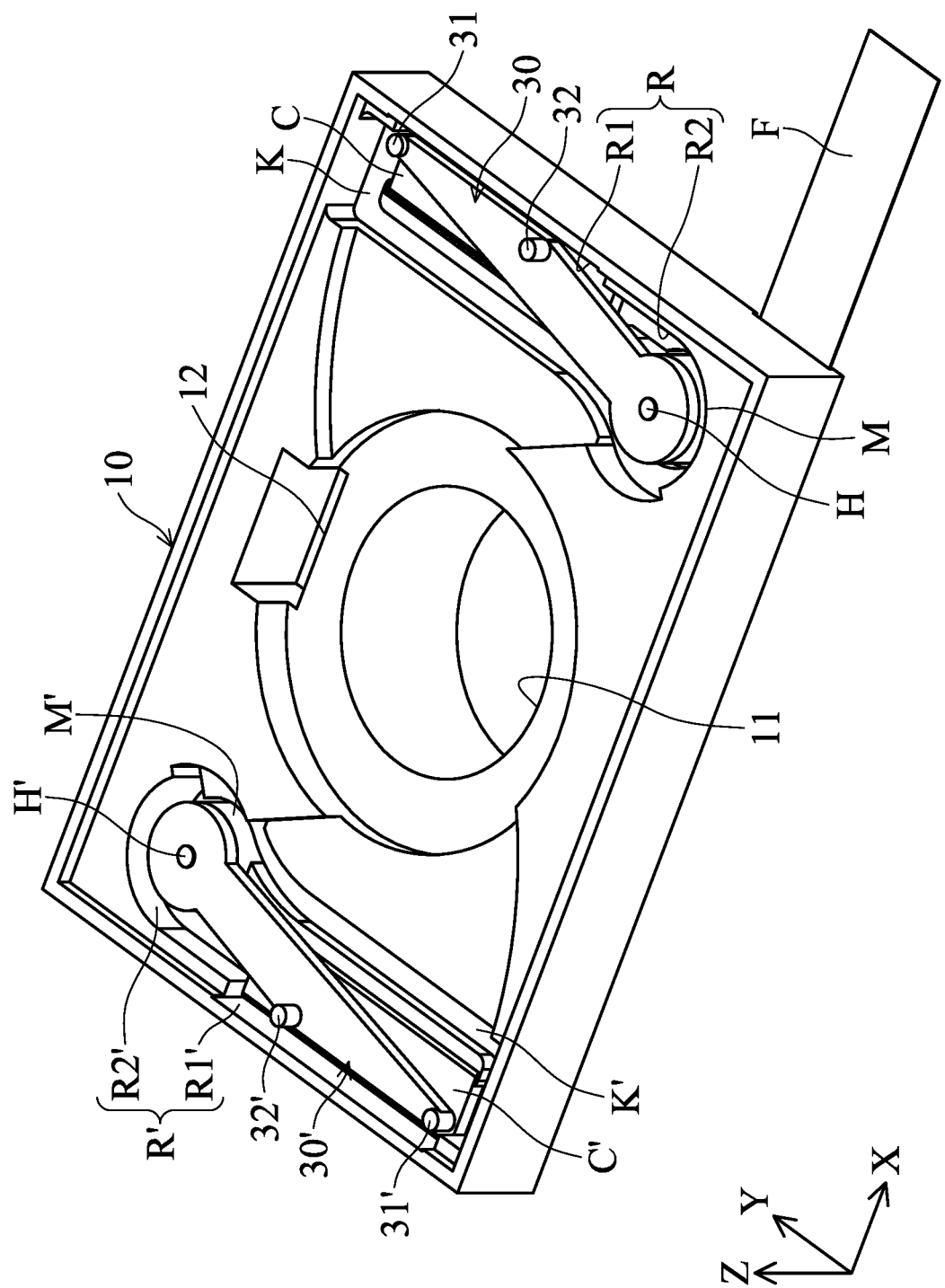
FIG. 7 is a perspective diagram showing the right and left rotary arms 30 and 30' (movable assembly) pivotally connected to the fixed part 10 via the first and second hinges H and H'.

FIG. 7 is a perspective diagram showing the right and left rotary arms 30 and 30' (movable assembly) pivotally connected to the fixed part 10 via the first and second hinges H and H'.

Referring to FIG. 7, after the magnets M, M', the coils C and C', and the magnetic permeable elements K, K' are disposed in the recesses R and R' of the fixed part 10, the right and left rotary arms 30 and 30' are respectively adhered to the magnets M, M', wherein the first and second hinges H and H' extend through the right and left rotary arms 30 and 30'.

In this embodiment, the magnets M, M', the coils C and C', and the magnetic permeable elements K, K' can constitute a driving assembly of the driving mechanism 100, wherein when a current signal is applied to the coil C, a magnetic field can be generated to impel the magnet M and the right rotary arm 30 rotating around the first hinge H. Similarly, when a current signal is applied to the coil C', a magnetic field can be generated to impel the magnet M' and the left rotary arm 30' rotating around the second hinge H'.

Figure 8:
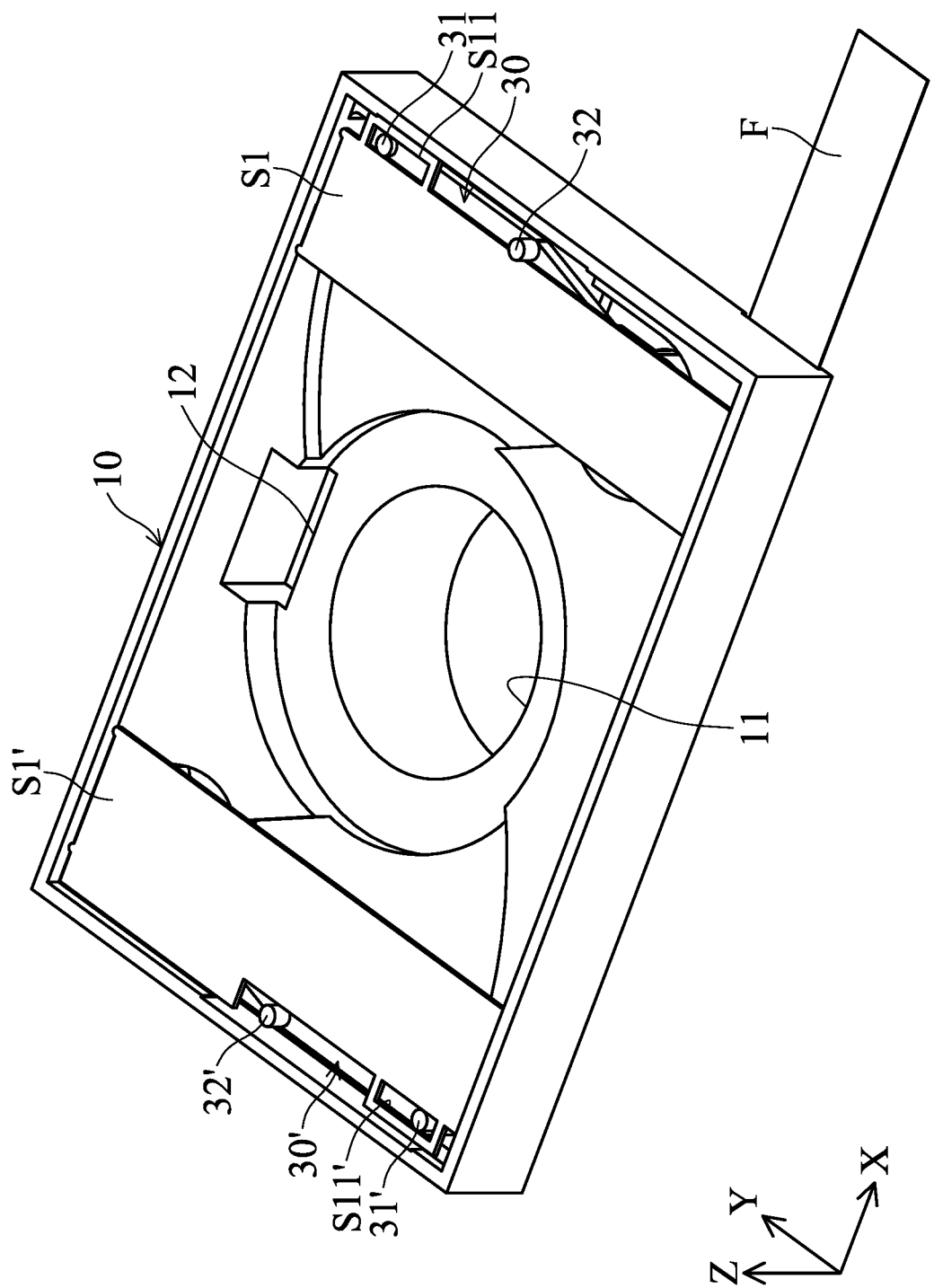
FIG. 8 is a perspective diagram showing the first pivot portions 31, 31' of the right and left rotary arms 30, 30' extending through the first slots S11, S11' of the first right blade S1 and the first left blade S1'.
Figure 9:
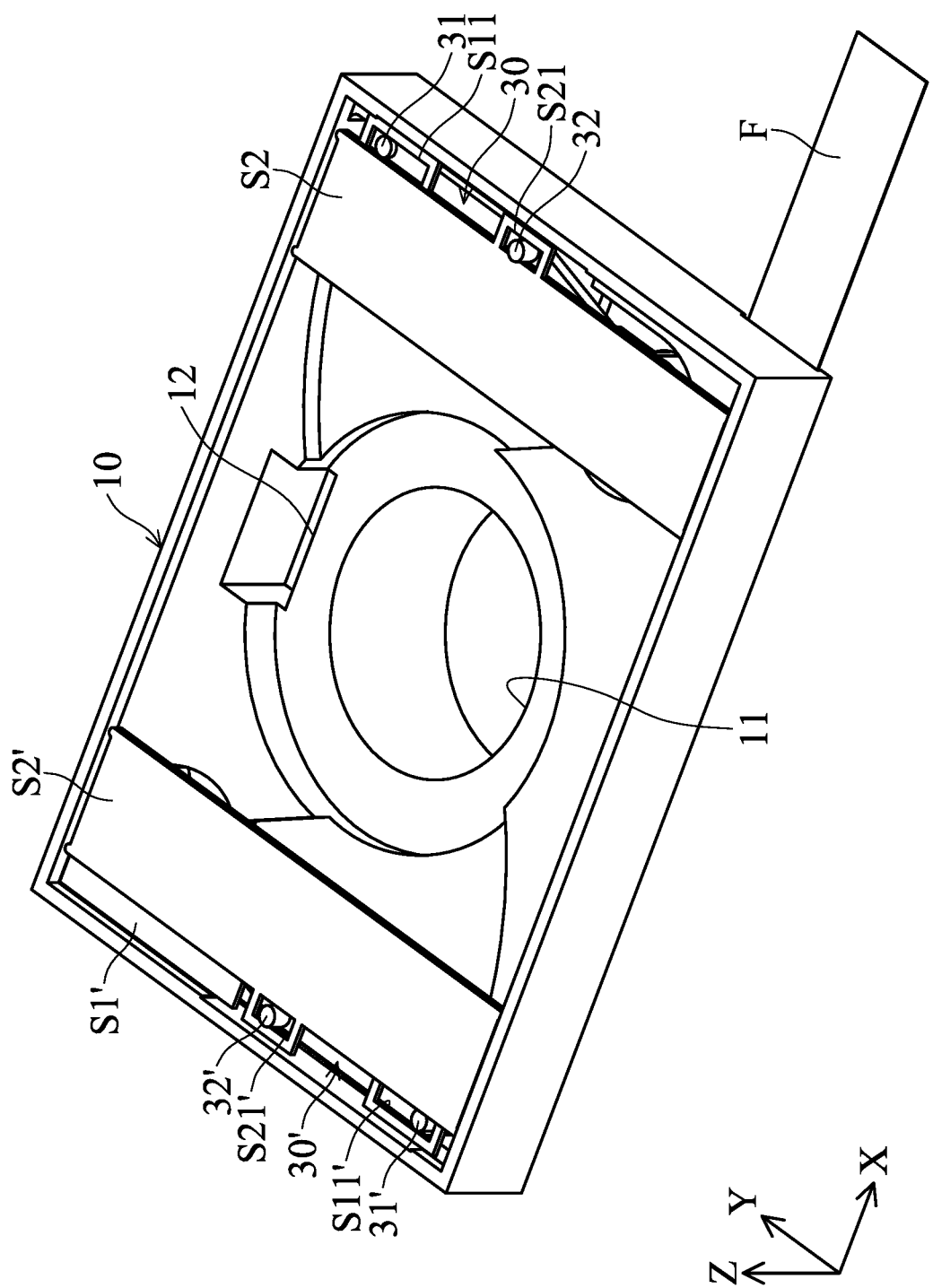
FIG. 9 is a perspective diagram showing the second pivot portions 32, 32' of the right and left rotary arms 30, 30' extending through the second slots S21, S21' of the second right blade S2 and the second left blade S2'.

FIG. 8 is a perspective diagram showing the first pivot portions 31, 31' of the right and left rotary arms 30, 30' extending through the first slots S11, S11' of the first right blade S1 and the first left blade S1'. FIG. 9 is a perspective diagram showing the second pivot portions 32, 32' of the right and left rotary arms 30, 30' extending through the second slots S21, S21' of the second right blade S2 and the second left blade S2'.

Referring to FIG. 8, after the right and left rotary arms 30 and 30' are respectively mounted on the magnets M, M', the first pivot portions 31, 31' of the right and left rotary arms 30, 30' are slidably engaged in the first slots S11, S11' of the first right blade S1 and the first left blade S1'. Hence, the first right blade S1 is pivotally connected to the right rotary arm 30, and the first left blade S1' is pivotally connected to the left rotary arm 30'.

Subsequently, as shown in FIG. 9, the second pivot portions 32, 32' of the right and left rotary arms 30, 30' are slidably engaged in the second slots S21, S21' of the second right blade S2 and the second left blade S2'. Hence, the second right blade S2 is pivotally connected to the right rotary arm 30, and the second left blade S2' is pivotally connected to the left rotary arm 30'.

It should be noted that the second pivot portion 32 of the right rotary arm 30 is located between the first pivot portion 31 and the first hinge H, and the second pivot portion 32' of the left rotary arm 30' is located between the first pivot portion 31' and the second hinge H'. When the right and left rotary arms 30, 30' rotate relative to the fixed part 10, the first pivot portions 31, 31' can slide within the first slots S11, S11', and the second pivot portions 32, 32' can slide within the second slots S21, S21', wherein the moving distance of the first right blade S1 and the first left blade S1' is greater than that of the second right blade S2 and the second left blade S2'.

Moreover, as shown in FIGS. 8 and 9, when the optical assembly (the first and second right blades S1, S2 and the first and second left blades S1', S2') is in the open position relative to the fixed part 10, the first hinge H is covered by the first right blade S1 and the first left blade S1', and the second hinge H' is covered by the second right blade S2 and the second left blade S2'. Therefore, the size of the fixed part 10 along the Y axis can be efficiently reduced to achieve miniaturization of the driving mechanism 100.

FIG. 10 is a perspective diagram showing that when a current signal is applied to the coils C, C', the first and second right blades S1, S2 and the first and second left blades S1', S2' are driven by the right and left rotary arms 30, 30' to slide relative to the fixed part 10 to a closed position.

Referring to FIG. 10, when a current signal is applied to the coils C and C', the coils C and C' can respectively generate a magnetic field to impel the magnets M, M' and the right and left rotary arms 30, 30' to rotate around the first and second hinges H and H'. Therefore, the first and second right blades S1, S2 can be driven by the right rotary arm 30 to slide in the —X direction toward the center of the hole 11. Similarly, the first and second left blades S1', S2' can be driven by the left rotary arm 30' to slide in the X direction toward the center of the hole 11, whereby the hole 11 is covered by the optical assembly (the first and second right blades S1, S2 and the first and second left blades S1', S2'), and light can be blocked from entering the electronic device through the hole 11.

In some embodiments, however, the driving mechanism 100 may comprise only one blade (e.g. the first right blade S1) or two blades (e.g. the first and second right blades S1 and S2) for covering the hole 11. That is, the first and second left blades S1' and S2' can be omitted from the driving mechanism 100, not limited to the embodiments of the invention.

As shown in FIGS. 4, 9, and 10, the first and second right blades S1, S2 and the first and second left blades S1', S2' have a longitudinal structure, and the fixed part 10 has a rectangular structure. Here, the long axes of the first and second right blades S1, S2 and the first and second left blades S1', S2' are parallel to the Y axis, and the short axis of the fixed part 10 is also parallel to the Y axis.

Namely, the long axes of the first and second right blades S1, S2 and the first and second left blades S1', S2' are parallel to the short axis of the fixed part 10. Furthermore, since the driving assembly (the magnets M, M', the coils C and C', and the magnetic permeable elements K, K') and the movable assembly (the right and left rotary arms 30, 30') do not protrude from the optical assembly (the first and second right blades S1, S2 and the first and second left blades S1', S2') in the Y direction (the short axis of the fixed part 10), the size of the fixed part 10 along the Y axis can be greatly reduced, thus facilitating miniaturization of the driving mechanism 100.

Figure 11:
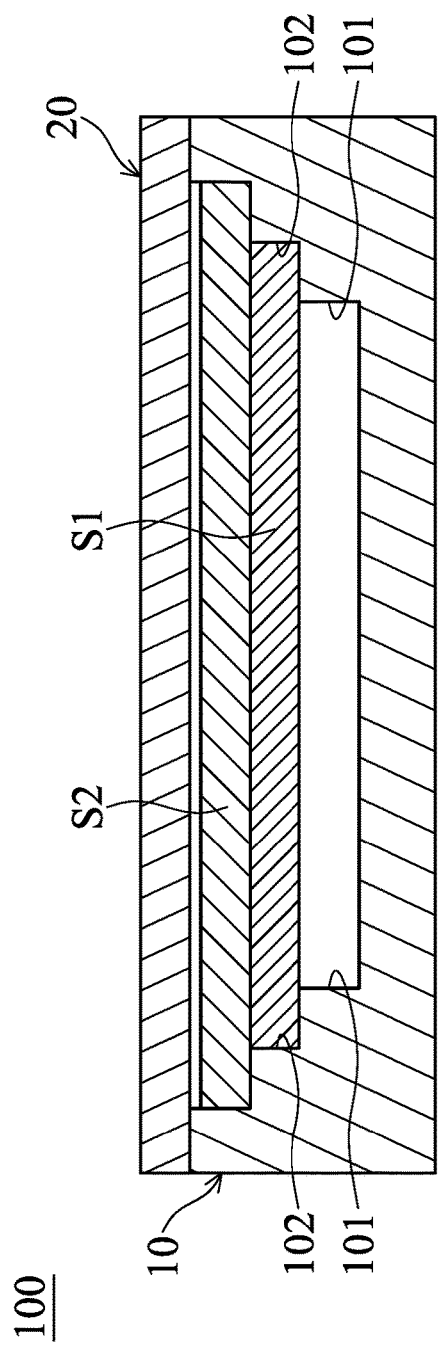
FIG. 11 is a cross-sectional view of the driving mechanism 10.

FIG. 11 is a cross-sectional view of the driving mechanism 10. As shown in FIG. 11, the cover 20 is mounted on the fixed part 10 and exposed to a side of the driving mechanism 100. It should be noted that the second right blade S2 is located between the first right blade S1 and the cover 20 after assembly. Similarly, the second left blade S2' is located between the first left blade S1' and the cover 20 after assembly.

Still referring to FIG. 11, a stepped structure is formed on the inner side of the fixed part 10, wherein the stepped structure has a first inner sidewall 101 and a second inner sidewall 102 higher than the first inner sidewall 101. In this embodiment, the first right blade S1 and the first left blade S1' slidably contact the first inner sidewall 101 of the fixed part 10, and the second right blade S2 and the second left blade S2' slidably contact the second inner sidewall 102 of the fixed part 10, wherein the second right and left blade S2 and S2' are longer than the first right and left blades S1 and S1'.

Figure 12:
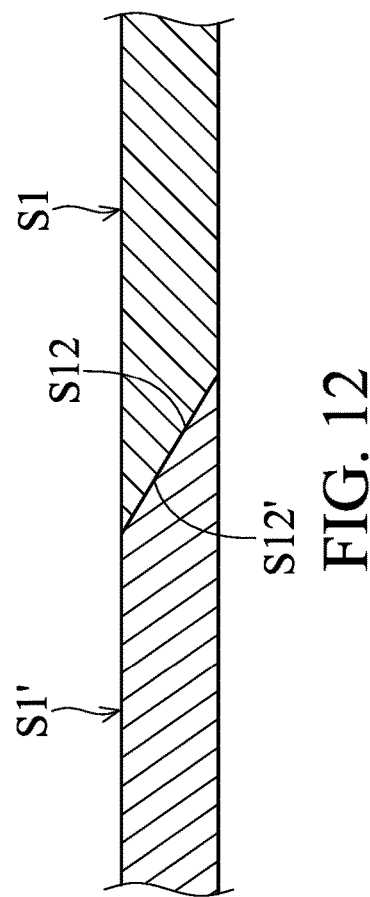
FIG. 12 is a partial cross-sectional view of the first right blade S1 and the first left blade S1'.

FIG. 12 is a partial cross-sectional view of the first right blade S1 and the first left blade S1'. As shown in FIG. 12, the first right blade S1 forms a slope surface S12, and the first left blade S1' forms a slope surface S12'. When the first and second right blades S1, S2 and the first and second left blades S1', S2' are driven by the right and left rotary arms 30, 30' to slide relative to the fixed part 10 to the closed position, the two slope surfaces S12 and S12' contact each other, whereby the first right blade S1 partially overlaps the first left blade S1'. Hence, light leakage through the gap between the first right blade S1 and the first left blade S1' can be avoided, and the damages caused by collision between the first right blade S1 and the first left blade S1' can also prevented.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism disposed in an electronic device, comprising:
    a hollow fixed part, having a hole;
    a movable assembly, movable relative to the fixed part, wherein the movable assembly has a right rotary arm pivotally connected to the fixed part via a first hinge;
    an optical assembly, having a first right blade connected to the right rotary arm, wherein the movable assembly movably connects the fixed part with the optical assembly, the first right blade at least partially covers the hole when the optical assembly is in a closed position relative to the fixed part, and the first right blade covers the first hinge when the optical assembly is in an open position relative to the fixed part; and
    a driving assembly, configured to drive the movable assembly and the optical assembly to move relative to the fixed part;
    wherein the optical assembly further has a second right blade, and the right rotary arm has a first pivot portion pivotally connected to the first right blade and a second pivot portion pivotally connected to the second right blade, wherein the second pivot portion is located between the first pivot portion and the first hinge.

2. The driving mechanism as claimed in claim 1, wherein the first right blade has a longitudinal structure, and the fixed part has a rectangular structure, wherein a long axis of the first right blade is parallel to a short axis of the fixed part.

3. The driving mechanism as claimed in claim 1, wherein the driving assembly has a magnet and a coil, and the fixed part has a recess for receiving the magnet and the coil, wherein the magnet surrounds the first hinge.

4. The driving mechanism as claimed in claim 3, wherein the recess has a first space and a second space, the coil is disposed in the first space, and the magnet is disposed in the second space.

5. The driving mechanism as claimed in claim 4, wherein the driving assembly further has a magnetic permeable element disposed in the first space and extending through the coil.

6. The driving mechanism as claimed in claim 5, wherein the magnetic permeable element has an U-shaped structure.

7. The driving mechanism as claimed in claim 1, wherein the first right blade has a first slot, and the second right blade has a second slot, wherein the first and second pivot portions are slidably received in the first and second slots.

8. The driving mechanism as claimed in claim 1, further comprising a cover connected to the fixed part and exposed to a side of the driving mechanism, wherein the second right blade is located between the first right blade and the cover.

9. The driving mechanism as claimed in claim 1, wherein the first right blade slidably contacts a first inner sidewall of the fixed part, and the second right blade slidably contacts a second inner sidewall of the fixed part.

10. The driving mechanism as claimed in claim 9, wherein the fixed part forms a stepped structure that includes the first inner sidewall and the second inner sidewall.

11. A driving mechanism disposed in an electronic device, comprising:
    a hollow fixed part, having a hole;
    a movable assembly, movable relative to the fixed part and having a right rotary arm and a left rotary arm;
    an optical assembly, having a first right blade, a first left blade, a second right blade, and a second left blade, wherein the right rotary arm pivotally connects to the fixed part and the first and second right blades, the left rotary arm pivotally connects to the fixed part and the first and second left blades, the first right blade at least partially covers the hole when the optical assembly is in a closed position relative to the fixed part, and the first right blade contacts the first left blade to block light from entering the electronic device through the hole when the optical assembly is in the closed position; and
    a driving assembly, configured to drive the movable assembly and the optical assembly to move relative to the fixed part.

12. The driving mechanism as claimed in claim 11, wherein the first right blade and the first left blade respectively forms a slope surface in contact with each other when the optical assembly is in the closed position relative to the fixed part.

13. The driving mechanism as claimed in claim 11, wherein when the optical assembly is in the closed position relative to the fixed part, the first right blade partially overlaps the first left blade.

14. The driving mechanism as claimed in claim 11, wherein the right rotary arm is pivotally connected to the fixed part via a first hinge, and the left rotary arm is pivotally connected to the fixed part via a second hinge, wherein when the optical assembly is in an open position relative to the fixed part, the first and second right blades cover the first hinge, and the first and second left blades cover the second hinge.

15. The driving mechanism as claimed in claim 11, wherein the first right blade and the first left blade slidably contact a first inner sidewall of the fixed part, and the second right blade and the second left blade slidably contact a second inner sidewall of the fixed part.

16. The driving mechanism as claimed in claim 15, wherein the fixed part forms a stepped structure that includes the first inner sidewall and the second inner sidewall.

\* \* \* \* \*